No. 720,680. PATENTED FEB. 17, 1903.
W. O. DAVIS.
GARDEN PLOW.
APPLICATION FILED OCT. 15, 1902.
NO MODEL.
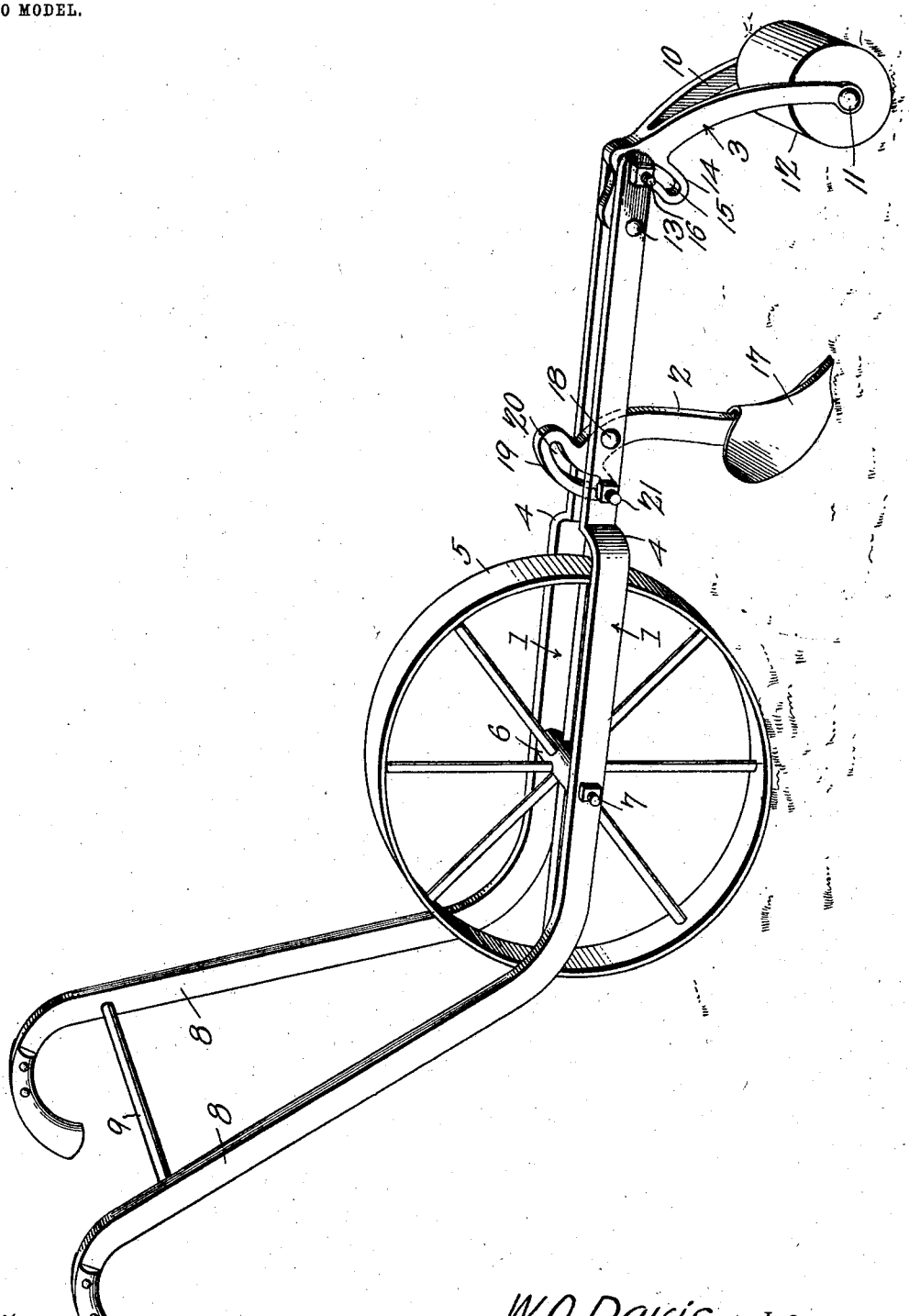

UNITED STATES PATENT OFFICE.

WILLIAM O. DAVIS, OF JACKSON, OHIO, ASSIGNOR OF ONE-HALF TO DAVID O. DAVIS, OF JACKSON, OHIO.

GARDEN-PLOW.

SPECIFICATION forming part of Letters Patent No. 720,680, dated February 17, 1903.

Application filed October 15, 1902. Serial No. 127,398. (No model.)

*To all whom it may concern:*

Be it known that I, WILLIAM O. DAVIS, a citizen of the United States, residing at Jackson, in the county of Jackson and State of Ohio, have invented a new and useful Garden-Plow, of which the following is a specification.

This invention relates to that class of devices for cultivating the soil which are known as "garden-plows" and which are lightly constructed to enable them to be manually operated, providing a device much handier and far more effective than a spade for turning and stirring the soil, as in gardens and similar places where it is not liable to be too hardly packed and caked.

My invention has for its object to provide a device of this class which shall possess superior advantages in point of simplicity, durability, and general efficiency; and with these ends in view it consists in the improved construction, arrangement, and combination of parts, which will be hereinafter fully described, and particularly pointed out in the claims.

The accompanying drawing represents a perspective view of a garden-plow constructed in accordance with the principles of my invention.

The frame of my improved garden-plow is composed of two side members or frame-beams 1 1, which are preferably constructed of iron, as light as may be consistent with reasonable strength. These side beams at their front ends lie closely together, as clearly shown in the drawing, being only spaced by the plow-standard 2 and the roller-frame 3, both of which will be presently more fully described. In rear of the plow-standard the beams 1 are provided with shoulders 4, curving outwardly, so as to increase the distance between the said beams sufficiently for the insertion between them of a wheel 5, the hub 6 of which is journaled upon an axle or spindle 7, connecting the beams, which latter at this point are spaced apart by the hub of the said wheel in such manner, however, as to permit the wheel to revolve freely and without danger of binding. From a point somewhat in rear of the axle 7 the side beams 1 are extended upwardly and slightly diverging, so as to form the handles 8, which are connected and at the same time spaced apart by means of a brace 9. Should one brace be considered insufficient, two or more may be used. If preferred, wooden handles may be used, being bolted or otherwise attached to the side pieces of the frame in rear of the axle 7.

10 designates a bifurcated frame, the ends of the arms of which have bearings for the spindle or axle 11, upon which the front roller 12 is journaled. The arms of the frame 10 are preferably curved divergently in a downward and forward direction from the point of attachment of said frame between the front ends of the side beams 1, where the said frame is mounted pivotally upon a bolt 13. The head of the frame 14 is enlarged, as shown, and provided with a curved slot 15, concentric with the pivotal point of attachment 13, for the passage of a bolt 16, which extends through said slot and through openings provided for its passage in the beams 1. It will be seen that provision is thus made for the vertical adjustment of the front roller, which by tightening the bolt 16 may be retained securely in any position to which it may be adjusted. Somewhat similar provision is made for the adjustment of the plow 17, the standard of which, 2, is mounted pivotally between the beams 1 upon a bolt 18 and is provided with an enlarged head 19, having a slot 20 for the passage of a bolt 21, which extends through the beams 1 and which admits of the adjustment of the plow within the range of the extent of the slot 20.

It will thus be seen that not only the front or guiding roller 12, but also the plow itself, may be adjusted to gage the depth of the furrow that it may be desired to turn. The said front or guiding roller, while of comparatively small diameter, is sufficiently wide to guide the plow more efficiently than a larger and narrower wheel, and its range of adjustment is ample to provide for any contingencies that may arise in the use of an implement of this class. The pivotal adjustment of the plow not only affects the distance between the plow and the beam, but it will also act to impart to the point of the plow a tilt which will sometimes be thought desirable.

The foregoing description, taken in connection with the drawing hereto annexed, will readily enable those skilled in the art to which it appertains to appreciate the advantages of my invention, while its operation will be apparent to all. In its construction I have aimed to use the fewest possible parts, realizing that much of the practical utility of a device of this class depends upon its simplicity. Thus it will be seen that the two frame-pieces also constitute the handles, while the only remaining members besides the two connecting-bolts needed are the roller, with its carrying-frame, the plow, and the supporting-wheel.

I desire it to be understood that while I have herein described the preferred construction of my invention I do not limit myself with regard to such structural details as relate to the exact shape or proportions of the parts, but reserve to myself the right to any changes and modifications which may be resorted to without departing from the spirit or scope of my invention or detracting from the utility of the same.

It is obvious that with regard to the kind of plow used in connection with my invention no limitation is made. An ordinary turning-plow, a cultivator-blade, a scraper or coverer, or any other kind of a blade may be used in connection with my invention, such blade being bolted or otherwise mounted upon the standard.

Having thus fully described my invention, I claim—

1. In a garden-plow, a frame consisting of two side beams having shoulders formed thereon, a supporting-wheel journaled between the portions of the beams spaced by said shoulders and a plow-standard and a roller-carrying frame mounted between the closely-adjacent portions of said beams.

2. In a garden-plow, a frame consisting of two beams disposed closely together and having shoulders forming spaced portions, a supporting-wheel mounted between said spaced portions, a roller-carrying frame mounted pivotally and adjustably between the front ends of the beams and having diverging curved arms between which a roller is journaled, and a plow-carrying standard mounted pivotally and adjustably between the beams intermediately between the shouldered portions and the front ends of the same.

3. In a garden-plow, a frame consisting of two beams disposed closely together at the front ends, a roller-carrying frame and a plow-carrying standard mounted pivotally between the closely-adjacent front portions of said beams, said frame and standard having enlarged heads provided with curved slots, adjusting-bolts extending through said curved slots and through the adjacent portions of the frame-beams, a supporting-wheel mounted between portions of the frame-beams which are spaced by shoulders formed thereon, and handles formed by upward and rearward diverging extensions of said frame-beams.

4. A garden-plow comprising a frame consisting of two side beams extending upwardly and rearwardly to form handles and supporting and operating means mounted between and connected entirely by said side beams.

5. A garden-plow comprising a frame consisting of two side beams extended to form handles, a brace connecting and spacing said handles, a supporting-wheel mounted between spaced portions of the beams and a roller-carrying frame and a plow-carrying standard mounted adjustably between the closely-contiguous front portions of the beams.

In testimony that I claim the foregoing as my own I have hereto affixed my signature in the presence of two witnesses.

WILLIAM O. DAVIS.

Witnesses:
BENNER JONES,
J. H. CLARK.